March 11, 1947.  M. G. WRIGHT  2,417,148
DIMENSION GAUGING MEANS
Filed Aug. 2, 1943  2 Sheets-Sheet 1
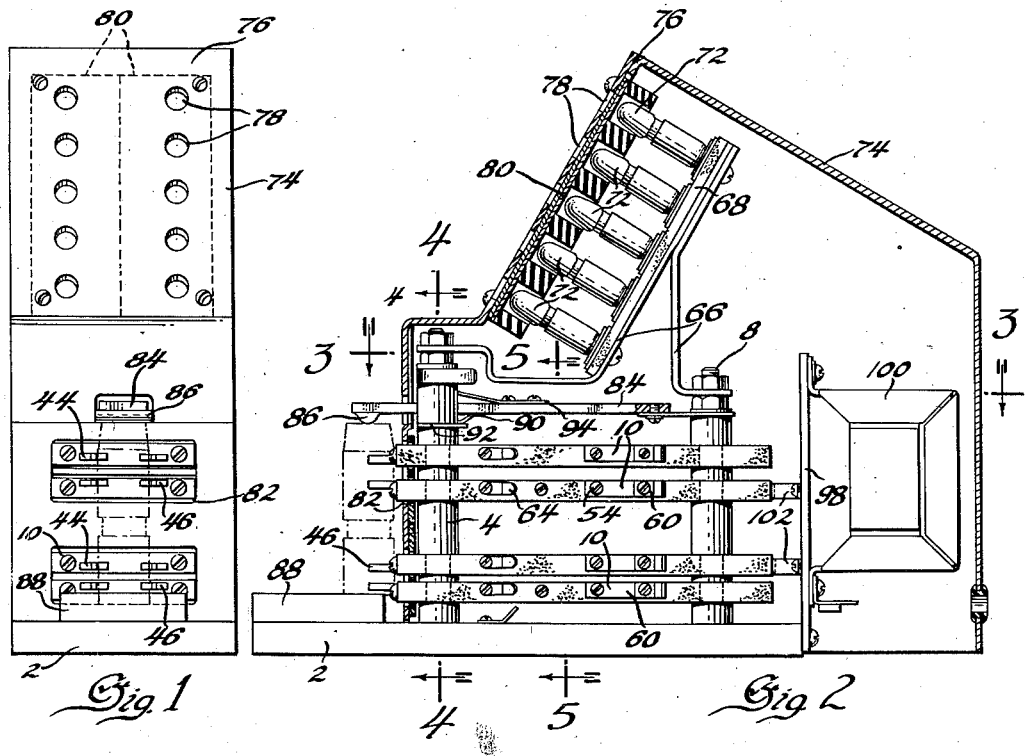
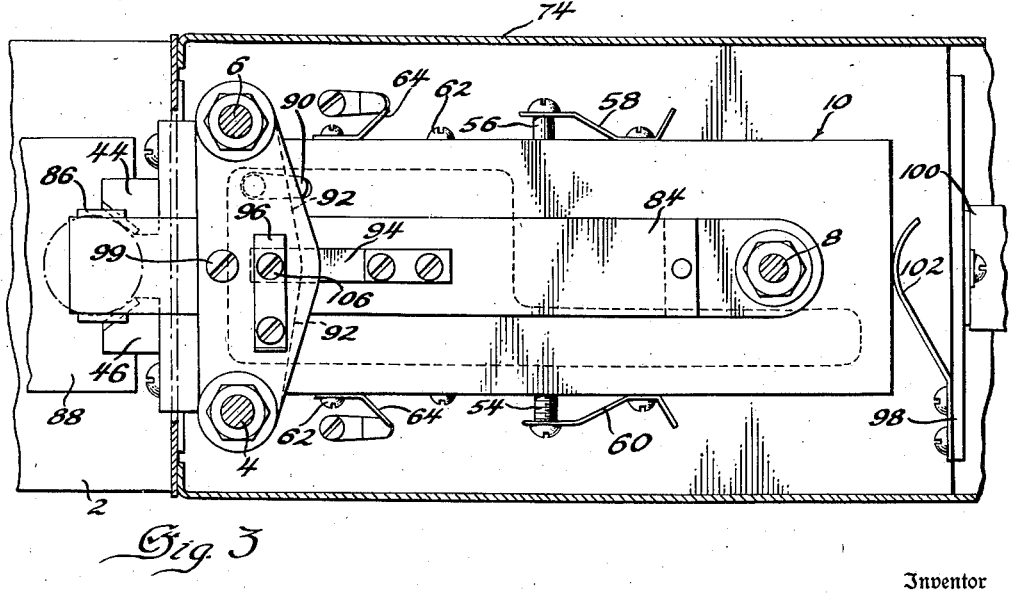
Inventor
Manfred G. Wright
By Blackmore, Spencer & Flint
Attorneys March 11, 1947.  M. G. WRIGHT  2,417,148
DIMENSION GAUGING MEANS
Filed Aug. 2, 1943  2 Sheets-Sheet 2

Inventor
Manfred G. Wright
By Blackmor, Spencer & Flint
Attorneys

Patented Mar. 11, 1947

2,417,148

UNITED STATES PATENT OFFICE 2,417,148

DIMENSION GAUGING MEANS

Manfred G. Wright, Kokomo, Ind., assignor to General Motors Corporation, Detroit, Mich., a corporation of Delaware Application August 2, 1943, Serial No. 497,015

8 Claims. (Cl. 33—174)

1

This invention relates to gauging means and more specifically to means for automatically gauging a piece for a plurality of dimensions simultaneously to ascertain if it falls within certain tolerances.

In quantity production it is necessary to provide some means for rapidly gauging or measuring parts as they flow along assembly or production lines and it is advisable to provide simple means, such, for example, as plug or ring gauges that are in common use. There are, however, many parts that have complex dimensions to be checked, such as, for example, a shell body where there are a number of different diameters along the length, plus the over-all length thereof.

It is an object of my invention to provide means for simultaneously checking a plurality of different dimensions on a test part.

It is a further object of my invention to provide means for simultaneously checking a plurality of dimensions on a part and giving immediate visual indication as to which dimensions are outside the tolerance limits and whether over or under the same.

It is a still further object of my invention to provide means for rapidly checking a plurality of different dimensions simultaneously by merely bringing the part into juxtaposition with the means.

It is a still further object of my invention to provide a compound gauging or checking means which is easily operated, easily adjusted to a part, and ruggedly constructed.

With these and other objects in view, which will become apparent as the specification proceeds, the embodiments of my invention will be best understood by reference to the following specification and claims and the illustrations in the accompanying drawings, in which:

Figure 1 is a front elevation of the gauging means of my invention;

Figure 2 is a longitudinal section through my gauging means;

Figure 3 is a sectional view taken on line 3—3 of Figure 2;

Figure 4:
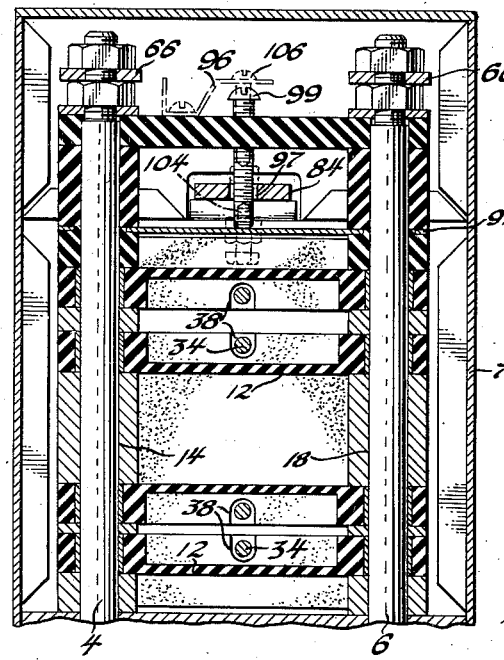
Figure 4 is a sectional view taken on line 4—4 of Figure 2.
Figure 5:
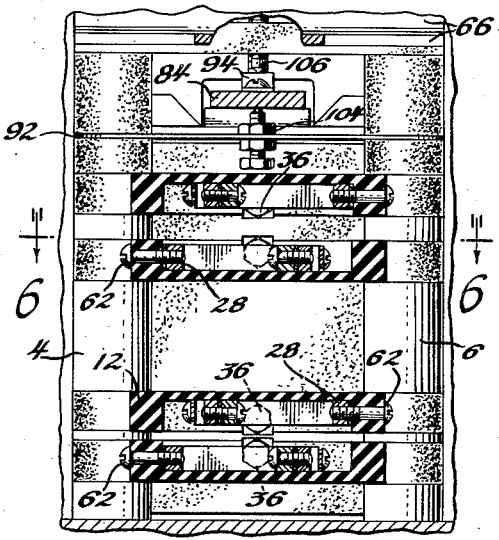
Figure 5 is a sectional view taken on line 5—5 of Figure 2.
Figure 6:
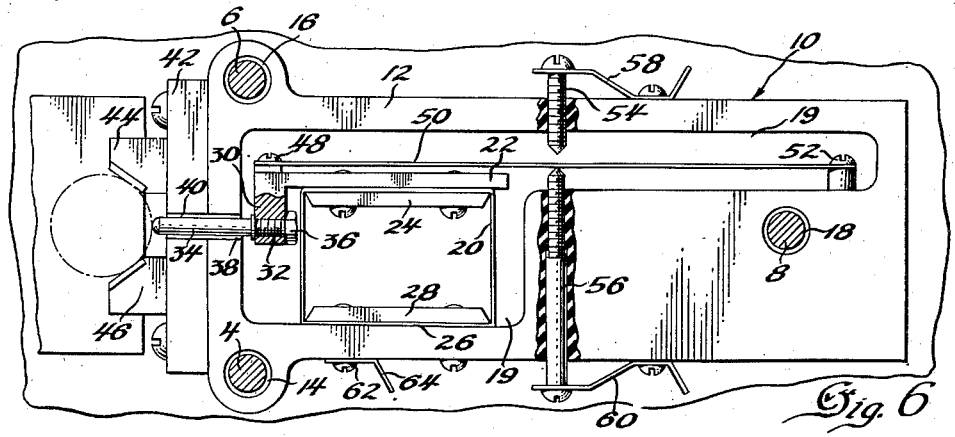
Figure 6 is a sectional view taken on line 6—6 of Figure 5.

Referring now more specifically to the drawings, there is shown in Figure 2 a base 2 having rigidly secured thereto a plurality of upstanding mounting studs 4, 6 and 8. Mounted upon these studs in parallel spaced relation are a plurality of duplicate gauging means 10. These gauging means, as will be seen by reference to Figure 2, are placed one above the other and are adapted to be spaced vertically at such distances as will accommodate the differences in exterior dimensions of the test piece being measured, that is, they will be sufficiently far enough apart so that each may gauge a particular diameter on the part tested. These gauging means 10 are best shown in Figure 6 and consist of a roughly rectangular plate 12 of insulating material such as Bakelite having three openings, 14, 16 and 18 therethrough, through which project the supporting studs 4, 6 and 8 of the base. An irregular shaped opening 19 is provided in the plate which is substantially square at one end and has a long narrow connecting portion in which is supported the actual switching apparatus.

This apparatus consists of a thin strip of metal 20 bent into a rectangular shape and having the two ends secured to an L-shaped bar 22, by a securing member 24 having screws extending therethrough and into the main body of the bar. The spaced section 26 parallel to the bar is likewise secured through a member 28 which is screwed to the opposite side of the opening in the member 12. Thus the strip forms a parallelogram or rectangle and supports the L-shaped bar so that it can move back and forth in this opening but does not tend to have any movement in any plane at right angles thereto.

The smaller arm 30 of the L-shaped bar has a tapped opening 32 therein which supports one end of a threaded stud 34 which is rigidly secured in place by a nut 36. The end of this stud extends through an opening 38 in the front portion of the member 12 and also through an opening 40 in a block 42 secured to the front face of the member 12. This member is of substantially the same thickness as the member 12 and carries on its face a pair of divergent jaws 44 and 46 on opposite sides of the projecting pin 34 with which surfaces the projecting end of the pin 34 determines the diameter or dimension being tested. Secured to the heel of the bar 22 by a suitable screw fastening 48 is one end of a long spring strip 50, the opposite end of which is secured adjacent the opposite end of the member 12 and in the opening 19 by another screw fastener 52. This spring member 50 therefore extends substantially the full length of the member 12 and by causing force to be applied adjacent the movable end, that is, that end secured to the bar, may be bowed to different degrees depending upon the force and movement applied. A contact screw 54 is supported in the member 12, which is, as before mentioned, of insulating material having screw thread engagement with the same whereby it may be moved in or out toward the spring strip. The end of the screw 54 is brought substantially to a point for accurate contact.

In alignment therewith and entering the member 12 from the opposite direction is a second contact screw 56 supported in similar manner and extending to a spaced point with the spring strip between its end and the end of the screw 54. To the end of screw 54 is attached a terminal strip 58 which is supported on one side of the member 12 and in like manner terminal strip 60 is secured to the terminal screw 56 on the opposite side. One of the screws 62 which clamps the member 28 against the portion 26 of the rectangular metallic strip 20 also has a terminal 64 connected therewith for the introduction of electric current, thus providing one terminal of power to the spring strip 50 itself, the other terminal being connected to the adjustable screws 54 and 56.

Figure 7:
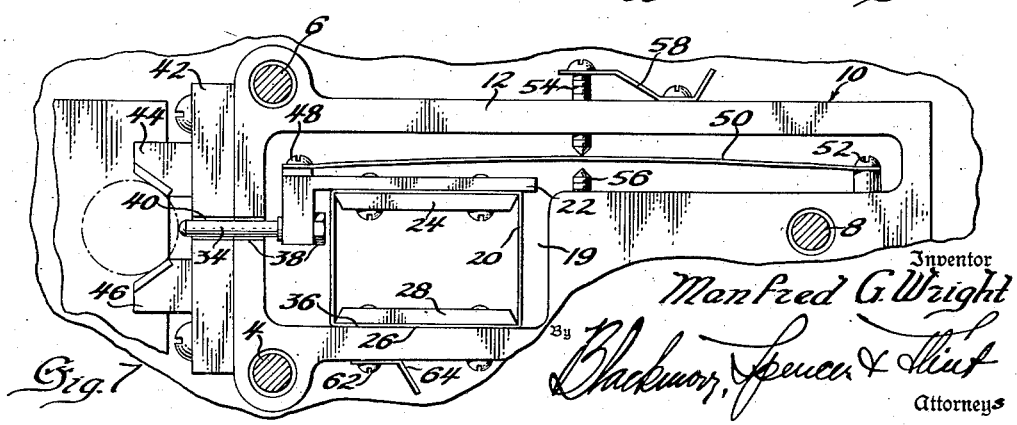
Figure 7 is a view similar to Figure 6 but showing the switching means in a different position due to the size of a piece being gauged.

Therefore, considering this one gauging means alone, if a member whose size it is desired to check is placed between the divergent jaws 44 and 46 and forced inwardly until it is in firm contact therewith, the inner surface of the test piece between the jaws will be in contact with the end of the movable stud 34. This will cause it to assume a definite position and therefore set the spring strip 50 in a definite arc. If the piece is of proper size, that is, within the tolerance limits, the strip 50 will lie between the pointed ends of the two contact screws 54 and 56 and touch neither. Thus no electrical circuit will be completed for signaling. If it is too large, then the arc will be less curved and the stud 34 will project farther out which will allow the bowed spring 50 to contact the lower threaded screw 56 and complete an electrical circuit therewith. If it is too small, then the spring 50 will be bowed upwardly to contact the threaded screw 54, as best shown in Figure 7. These two screws are connected to signaling lights which will be described more in detail at a later point. Thus by turning either of the threaded screws 54 or 56, the operator can set up the desired tolerances on the piece before actual gauging begins. This may be done of course very easily by applying members to the gauging means having outside tolerance limit dimensions and adjusting the screws so that they just touch the bowed spring 50 at that point.

If there were only one dimension to gauge, it would only be necessary to provide such apparatus as has been previously described, mounting the same on a suitable standard so that the test piece could be applied between the jaws. However, as previously stated, there are many instances in which a plurality of dimensions or diameters must be checked on a single piece with perhaps additional dimensions such as length. Therefore I have illustrated a means for supporting a plurality of these unit gauges in juxtaposition and there are shown herein as an example four of these which are mounted in vertical alignment, all of which are mounted one above the other on the supporting studs 4, 6 and 8, the vertical distance between the various gauges of course depending upon the configuration and dimensions of the piece to be gauged.

Mounted on the top of the studs is a frame 66 which supports an insulating plate 68 upon which are mounted a plurality of small electric sockets, arranged in two rows, one on each side of the plate. In each of these sockets there is secured a small electric lamp 72 for indicating purposes. A casing 74 is secured to the base and encloses substantially all of the equipment heretofore mentioned. This casing has a sloped upper front portion 76 having therein a series of openings 78 adjacent the end of each bulb and carries on its inner surface a plate 80 of colored transparent material such as glass to indicate different signals. All the tubes, let us say on the right hand side of the panel, would be covered by red glass panels, and all those on the left by green glass, indicating either too large or too small a piece lying outside the tolerance limits. The front of the lower portion of the casing also has a series of rectangular openings such as 82 through which project the front section of the actual gauging units previously described.

Mounted upon the top of the stud 8 and clamped thereon by suitable securing means over the bracket 66 is a spring supported lever 84 which projects through the front wall of the casing and on its projecting portion has a small cylindrical protuberance 86. This gauging protuberance on the spring lever 84 is adapted to cooperate with a block 88 mounted on the base 2 to gauge the full length of a piece inserted in the front of the gauge. A terminal contact 90 is secured to conductive plate 92 supported on the studs 4 and 6, but electrically insulated from the same, which in turn carries an adjustable contact screw 104 cooperating with the lever. The lever also carries on its upper surface a second spring contact 94 which is adapted to cooperate with a stationary adjustable contact 96, also insulatedly mounted from the two studs. An adjustable stop 99 is also mounted adjacent contact 96 and extending through clearance hole 97 in spring lever 84 depressing conductive plate 92 to prevent the lever from moving below a desired point. A panel 98 is supported on the rear portion of base 2 in vertical position and holds within the casing a supply transformer 100 to reduce the normal 110 volt or 220 volt systems to a lower voltage for the gauging and lighting means. This panel also has secured to its forward face a plurality of biasing springs 102 which bear against the rear surface of a portion of the gauging units to provide a spring bias of two toward the part to be gauged.

The electrical connections have not been shown in detail as they are quite obvious. One terminal of the incoming line is connected to the terminals 64 on each of the gauging units and to the contact 90 of the vertical gauging lever. The opposite incoming line terminal is connected to one side of each of the sockets for the indicating tubes. A line from the other side of each socket of one row extends to each of the adjustable screws 54 in the units and a line from the opposite side of the sockets in the second row extends to the connection terminal 60 on the opposite side of the units. It will thus be obvious that as a test piece is inserted, such as that shown in dotted lines in Figure 2, the various diameters of the piece will force the studs 34 in each unit to assume different positions. If all of the diameters are within the tolerances, the bowed spring 50 in each case will lie between the two adjusted contact terminals and neither light operated by any one unit will be illuminated.

However, let us suppose that the lower dimension is of too small a diameter, then the lowest unit 10 will have its stud 34 pressed inwardly far enough so that the bowed spring 50 will contact the end of the upper screw 54, thus closing a circuit for one of the lights connected therethrough. Let us assume that we use the left hand series of the lights as shown in Figure 1 for the undersize gauge, then the lower left hand light will be illuminated. Of course if this particular portion of the test piece had been oversize, then the stud 34 would not have been pressed inwardly a sufficient amount to raise it off the lower terminal stud 56 and the lower right hand light would have been illuminated. Thus if neither light is on for any one gauge, it shows that this part is within the tolerance limit, or if either light is illuminated, the part is either oversize or undersize, depending on which light is lit.

With regard to the gauging of the length of the member, the adjustable contact screw 106 is set so that it just touches and makes contact with distortable spring 94 when a test piece just over the high tolerance is placed in the gauge. When this contact is made, a circuit is completed from terminal 96, screw 106, spring 94, to lever 84. One of the lamps in the top tier is connected in this circuit. Low limit adjustment is made by placing contact 104, carried on conductive plate 92 and adjusted by screw 99 which deflects plate 92, so that its top just touches the lever 84 when the test piece is just under the short tolerance. When 104 and 84 are in contact, a circuit is completed from terminal 90, conductive plate 92, contact 104, to lever 84. Another lamp is connected to this circuit. Thus when a test piece is inserted, as shown in dotted lines in Figure 2, if it is too short lever 84 will rest on contact 104, closing the circuit, and an indicator lamp will be lit; if it is within tolerance limits, neither light will be lit, and if it is too long, contact screw 106 will make contact with spring 94, closing the circuit so that the other indicator lamp will be lit. Thus by a mere single insertion of a piece having a complex outline, all of the various dimensions thereof can be checked immediately through a simple visual method which is very accurate and satisfactory for high speed mass production. It will also be obvious that the spaces between the unit gauges may be altered to accommodate different outlines of parts to be tested.

I claim:

1. In gauging means, an insulating support having an elongated opening therein, a bendable strip having one end rigidly secured to the support located in the opening, means to apply axial pressure to the strip mounted on its free end whereby it will assume different degrees of arc bowing dependent upon the pressure and movement and adjustable contacts mounted on opposite sides of the strip at an intermediate point and in alignment with each other whereby switching means is formed.

2. In gauging means, a plurality of unit insulating supports having central apertures therein, means for clamping said units together, bendable strips secured at one end within each aperture, means adapted to engage a part to be gauged secured to the free end of each strip and a pair of contact members mounted on opposite sides of an intermediate portion of each bendable strip to form switching means therewith whereby when a part is brought into juxtaposition to the assembly the engaging means assume different positions, depending on the size of the piece, and the strips connected thereto also assume a position which may engage a contact to complete a switching operation.

3. In gauging means, a plurality of unit insulating supports having central apertures therein, means for clamping said units together, bendable strips secured at one end within each aperture, means adapted to engage a part to be gauged secured to the free end of each strip and a pair of contact members mounted on opposite sides of an intermediate portion of each bendable strip to form switching means therewith whereby when a part is brought into juxtaposition to the assembly the engaging means assume different positions, depending on the size of the piece, and the strips connected thereto also assume a position which may engage a contact to complete a switching operation, and indicating means connected to the contact members to indicate to an operator which of the switches are closed.

4. In gauging means, a plurality of unit insulating supports having central apertures therein, means for clamping said units together, bendable strips secured at one end within each aperture, means adapted to engage a part to be gauged secured to the free end of each strip, a pair of contact members mounted on opposite sides of an intermediate portion of each bendable strip to form switching means therewith whereby when a part is brought into juxtaposition to the assembly the engaging means assume different positions, depending on the size of the piece, and the strips connected thereto also assume a position which may engage a contact to complete a switching operation, indicating means connected to the contact members to indicate to an operator which of the switches are closed, a part of said indicator means being differentiable from the remainder, connections from one group to the contacts on one side of the strips to said part of said indicating means and from the other group of contact members on the other side of the strips to the other part of said indicating means whereby under and oversize can be determined for each unit.

5. In gauging means, a support, a plurality of deflectable spring strips secured at one end mounted on said support and substantially along an axis of the same, work engaging means mounted on the relatively free end of each strip to engage the work in a plane longitudinally of said strips, work locating means mounted on the support whereby the work may be located at a definite point, engaged by the work engaging means at various places along its length to provide longitudinal pressure and cause the strips to bow and assume positions dependent upon the value of the dimension, and switching means mounted adjacent each intermediate portion operated by each strip.

6. In gauging means, a support, a plurality of deflectable spring strips secured at one end mounted on said support and substantially along an axis of the same, work engaging means mounted on the relatively free end of each strip to engage the work in a plane longitudinally of said strips, work locating means mounted on the support whereby the work may be located at a definite point, engaged by the work engaging means at various places along its length to provide longitudinal pressure and cause the strips to bow and assume positions dependent upon the value of the dimension, switching means mounted adjacent each intermediate portion operated by each strip, and indicating means mounted on the support and controlled by the switching means.

7. In gauging means, a plurality of unit insulating supports having central apertures therein, means for clamping said units together, bendable strips secured at one end within each aperture, means adapted to engage a part to be gauged secured to the free end of each strip and a pair of contact members mounted on opposite sides of an intermediate portion of each bendable strip to form switching means therewith whereby when a part is brought into juxtaposition to the assembly the engaging means assume different positions, depending on the size of the piece, and the strips connected thereto also assume a position which may engage a contact to complete a switching operation, and resilient means biasing the units toward the piece being tested.

8. In gauging means a support to which the piece to be gauged is applied, a bendable strip having one end rigidly secured to the support, the opposite end being free to move with respect to said support, means to apply axial pressure to the free end of the strip whereby it will assume different degrees of arc bowing dependent upon the pressure and movement and adjustable contacts mounted on the support on opposite sides of the strip to cooperate with the same to provide switching means.

MANFRED G. WRIGHT.

REFERENCES CITED

The following references are of record in the file of this patent:

UNITED STATES PATENTS

| Number | Name | Date |
|---|---|---|
| 2,254,812 | Aller | Sept. 2, 1941 |
| 2,018,399 | Engst | Oct. 22, 1935 |
| 1,894,025 | Dennison et al. | Jan. 10, 1933 |
| 1,893,205 | Hughes | Jan. 3, 1933 |
| 2,208,635 | Johnson | July 23, 1940 |
| 1,435,154 | Alderborgh | Feb. 26, 1924 |
| 2,352,507 | Aller | June 27, 1944 |

FOREIGN PATENTS

| Number | Country | Date |
|---|---|---|
| 334,222 | Italian | Jan. 23, 1936 |